United States Patent [19]

Stoffers et al.

[11] Patent Number: 5,335,458
[45] Date of Patent: Aug. 9, 1994

[54] PROCESSING OF MAGNETIC HEAD FLEXURES WITH SLIDER ELEMENTS

[75] Inventors: Mark A. Stoffers, San Jose, Calif.; Dulyarat Mokorarat, Bangkok, Thailand; Bradley T. Peceimer, Fremont, Calif.

[73] Assignee: Read-Rite Corporation, Milpitas, Calif.

[21] Appl. No.: 763,591

[22] Filed: Sep. 23, 1991

[51] Int. Cl.$^5$ .............................................. B24B 1/00
[52] U.S. Cl. ...................................... 51/317; 51/323; 51/326
[58] Field of Search ............... 51/281 R, 326, 317, 51/318, 323, 292, 328, 165.71, 165 R, 119, 5 R

[56] References Cited

U.S. PATENT DOCUMENTS

| | | | |
|---|---|---|---|
| 3,685,216 | 8/1972 | Frey et al. | 51/324 |
| 4,675,986 | 6/1987 | Yen | 29/603 |
| 4,914,868 | 4/1990 | Church et al. | 51/165.77 |
| 4,979,334 | 12/1990 | Takahashi | 51/120 |

*Primary Examiner*—M. Rachuba
*Attorney, Agent, or Firm*—Nathan N. Kallman

[57] ABSTRACT

A system for processing head flexure assemblies employs lapping and edge blending means, interposed with washing, drying and heating equipment. The head assembly processing is implemented within a compact U-shaped arrangement. The lapping means and edge blending means incorporate precision alignment and securing components to ensure that the lapping and edge blending processes are accurately and expeditiously performed. The equipment and tooling used are contained in a relatively small area and insure an increased production rate and yield with high quality head assemblies lapped and edge blended to precise specifications.

15 Claims, 17 Drawing Sheets

PROCESSING OF MAGNETIC HEAD FLEXURES WITH SLIDER ELEMENTS

FIELD OF THE INVENTION

This invention relates to a method and means for lapping and processing head flexures and sliders used with magnetic head arm assemblies for use in disk drives.

BACKGROUND OF THE INVENTION

Description of the Prior Art

Disk drives typically include one or more magnetic disks and a multiplicity of magnetic head arm assemblies. The head arm assemblies comprise head slider elements that are mounted to flexures or suspensions. Thin film transducers are disposed on the ends of rails formed along the air bearing surface (ABS) of a head slider, whereby the the thin film transducers can coact with selected data tracks on the disks for recording and reading data.

The magnetic head sliders are designed to fly as close as possible over the disk surfaces during the accessing and read/write modes. Various shapes and geometries of the slider have been proposed to achieve a desired low flying height. Examples of typical head sliders are described and illustrated in U.S. Pat. Nos. 3,855,625 and 4,420,780.

During manufacture of the head assemblies, a multiplicity of sliders are made from a ceramic bar that is lapped to obtain a predetermined throat height of the thin film transducers. The lapping procedure can be used to shape the ABS and longitudinal rails on which the thin film transducers are located and thus configure the aerodynamic surface of the slider. For example, one slider configuration incorporates a crown shape which must be made within specified technical tolerances. For this purpose the lapping operation needs to be tightly controlled in order to realize a high yield and high production rate with resultant good quality head sliders.

Also, during the lapping operations of the slider, polishing materials are used that must be removed from the head flexure assembly (HFA) prior to installation in a disk drive. The cleansing operation also needs to be well controlled to avoid damage and to remove residual contaminants from the head arm assemblies.

A conventional magnetic head production line is generally designed with production line tables that are placed parallel to each other wherein each step of the assembly process is successively accomplished in a linear progression as the workpieces are moved from one station to the next. It has been found that this arrangement requires excessive space and undue handling when transferring the workpieces from one table to the next.

SUMMARY OF THE INVENTION

An object of this invention is to provide a method and means for processing and producing magnetic head sliders and flexure assemblies of high quality with an increased production yield.

Another object of this invention is to provide a method and means for cleaning head arm assemblies subsequent to the lapping operation.

Another object of this invention is to process head flexures with sliders in a compact production area thereby realizing a significant savings in space.

According to this invention, magnetic head flexures and sliders are processed during a lapping procedure in a compact production area set up substantially in a U-shaped design which has a number of adjacent operator stations. Lapping machines are located adjacent to the open end of the U-shaped configuration at which different processing equipments are provided. A number of head flexure assemblies are first aligned and seated in transfer tools or pucks. A plurality of pucks holding a number of head flexures are placed in a lapping machine in which the sliders are lapped to a desired curvature and to a predetermined throat height dimension. The head flexures and attached sliders are secured in the pucks and are washed using an oscillating spray. The flexure and slider assemblies are blow dried with clean air and dried further by heat application. Thereafter the sliders are edge blended, and the assemblies are cleaned ultrasonically in a detergent, rinsed and again washed, clean air blow dried and dried by heating. As a result, all undesirable lapping diamond slurry and diamond tape residue is removed from the head flexure and slider assemblies which are then ready for assembly to a head actuator of a disk drive.

BRIEF DESCRIPTION OF THE DRAWINGS

The invention will be described in greater detail with reference to the drawings in which.

Similar numerals refer to similar elements throughout the drawings.

DETAILED DESCRIPTION OF THE INVENTION

Figure 1:
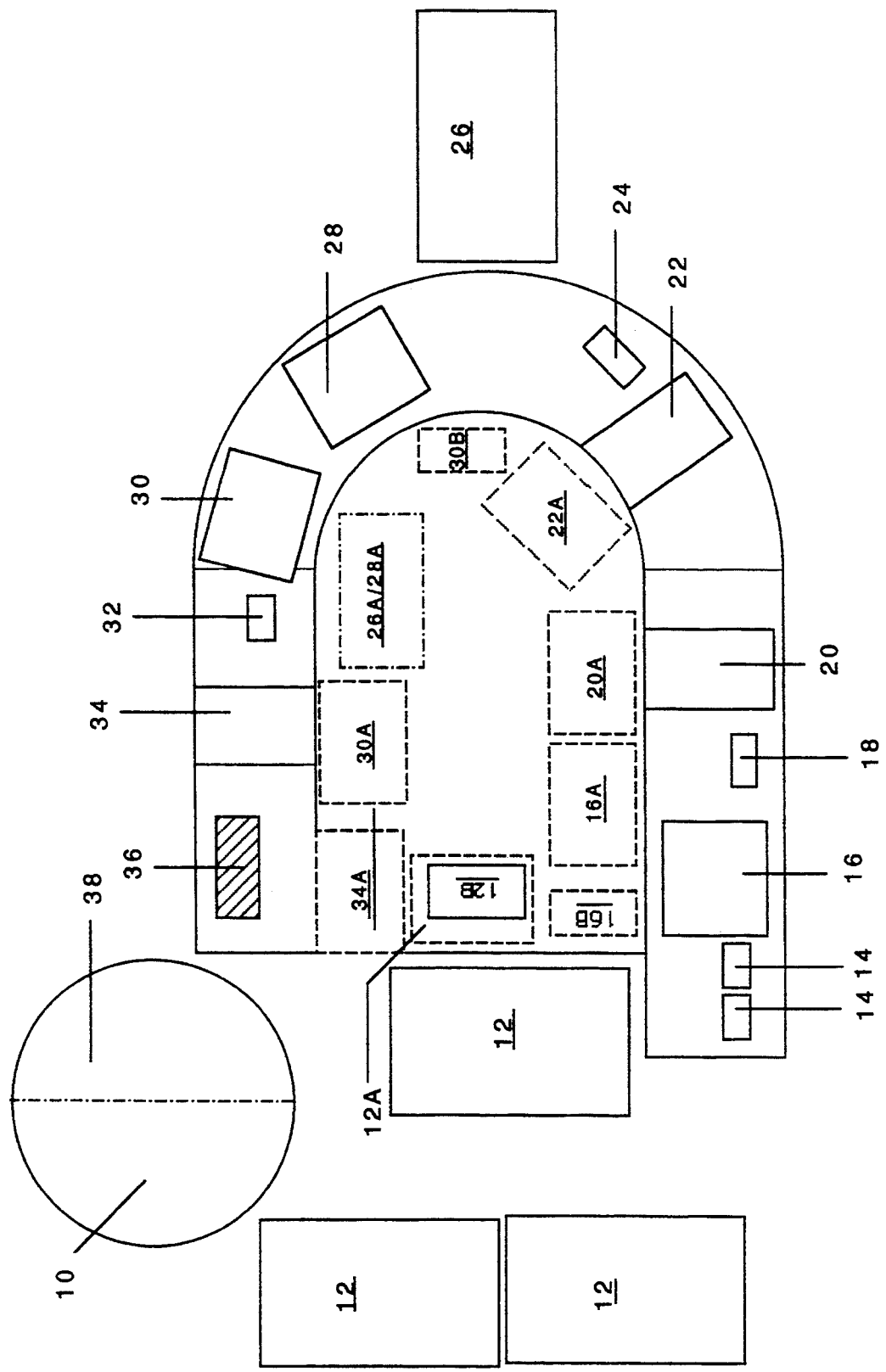
FIG. 1 is a representational plan view of the arrangement of stations for processing magnetic head flexures and sliders, in accordance with this invention.
Figures 2A, 2B:
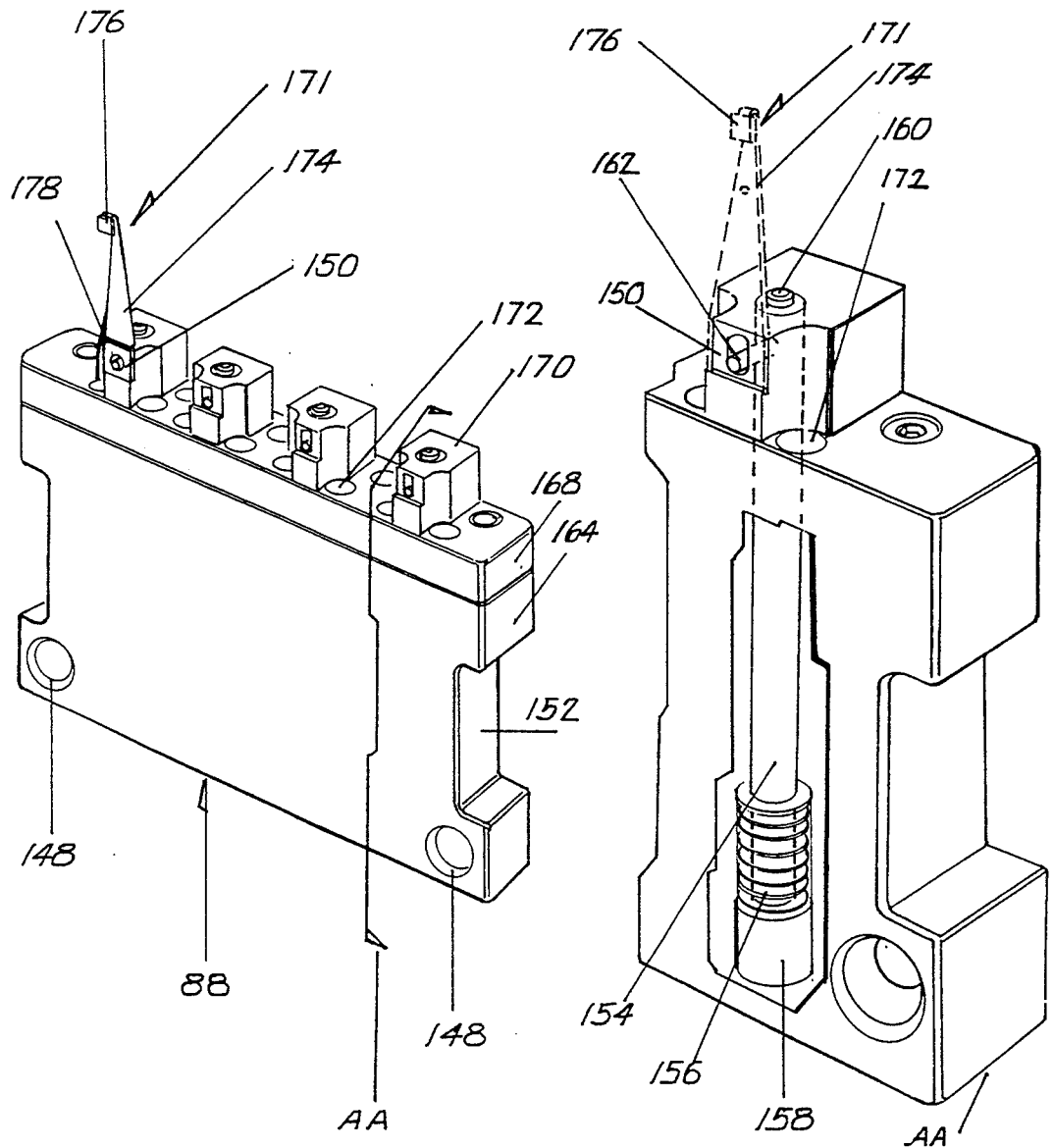
FIG. 2A is a perspective front view of a transfer tool or puck showing one head flexure assembly mounted thereto.
FIG. 2B is a perspective view taken along line A—A showing a segment of the puck of FIG. 2A, with a portion opened to illustrate a spring-loaded shaft.

With reference to FIGS. 1-4, a number of head flexures 171 are individually loaded into transfer tools or pucks 88 by one or more operators at station 10. Each head flexure 171 comprises a suspension 174, a mount plate 150, a wire tubing assembly 178 and a ceramic slider 176 on which thin film transducers are deposited. The wire tubing assembly 178 is coupled to the coil of the thin film transducer for conducting signals to and from the magnetic head assembly. The puck 88 has four identical locking and aligning mechanisms 170 that are adapted to mount four HFAs at specified locations relative to two alignment holes 148 in the puck. The puck 88 is made of a two piece hardened 440 steel and a nickel plated aluminum assembly 164. The locking and aligning mechanism 170 locates the mount plate 150 of the flexure or suspension 174 against a square raised reference edge. The mount plate 150 is pulled against the reference edge by a spring loaded pin 162 that goes through a tooling hole in the mount plate 150. The spring loaded pin 162 is held at the correct height by a set screw 160 disposed in a spring loaded shaft 154. A spring 156 is in compression against a contact button 158 and a shoulder inside the puck. The spring loaded shaft assembly gives the pin 162 sufficient force to pull the mount plate 150 against the raised reference edge. As a result, the head slider 176 is located in a given position relative to the alignment holes 148 and the reference face surface of the puck 88. The contact button 158 is accessible to the back of the puck and is used to push upwards so that the pin 162 can be moved to unload and load the HFA mount plate 150 against the reference edge. Cutout sections 152 of the puck 88 allow easier handling of the transfer tool.

In production, the pucks 88 with four HFAs 171 are seated onto a load/unload jig 188 (FIG. 3) and are engaged with dowel alignment pins 184 of the jig. Keys 180 on the front of the jig are depressed to unlock a head flexure lock, thereby allowing the head flexures 171 to be individually loaded into place and locked by releasing each of the four keys 180. In a preferred approach, the jig 188 is loaded by four operators, each of which loads one HFA into place on the puck assembly. The first operator at station 10 receives an unloaded puck assembly from an operator who has removed completely processed pucks from the jig 188 at station 38 at the end of the U-shaped assembly line and also has removed the processed HFAs from each puck. The puck is passed counterclockwise at station 10 from the first operator consecutively to second, third and fourth operators, each of which inserts one HFA into place on the puck. When the puck is fully loaded with four head flexures, the puck 88 is unloaded from the jig 188 by the fourth operator and placed into a rack on a small rectangular table adjacent to station 10. The empty jig is then put between the fourth operator and a fifth operator at station 38. The pucks with the HFAs that have been processed through stations 12-36 are placed back into the empty jigs 188 at station 38 for unloading of the HFAs and the processed HFAs are transferred to storage trays. Empty storage trays are the same trays used to convey unprocessed HFAs into the loading operation at station 10.

Figure 3:
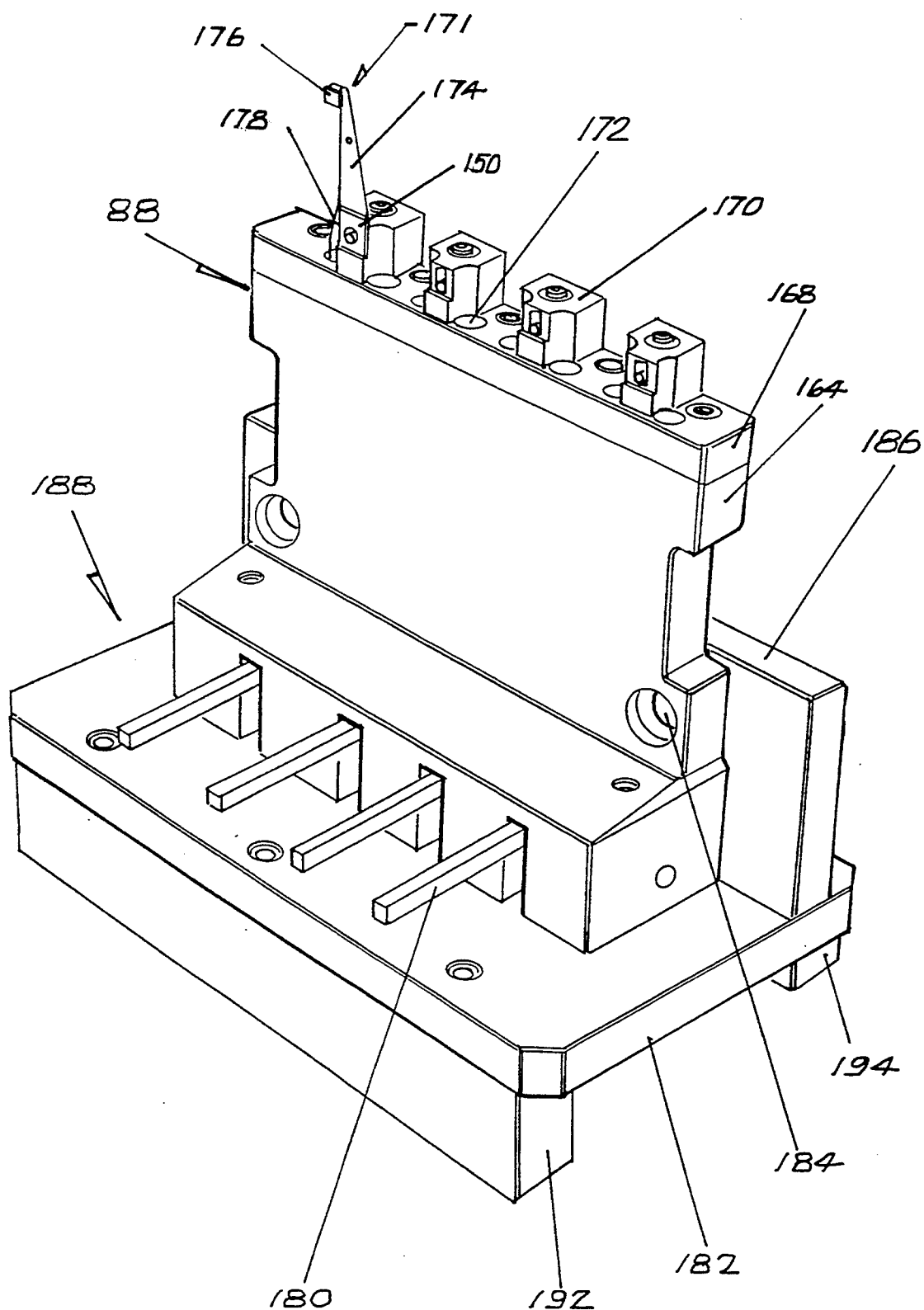
FIG. 3 is a perspective view of a puck mounted to a load/unload jig fixture.
Figure 4:
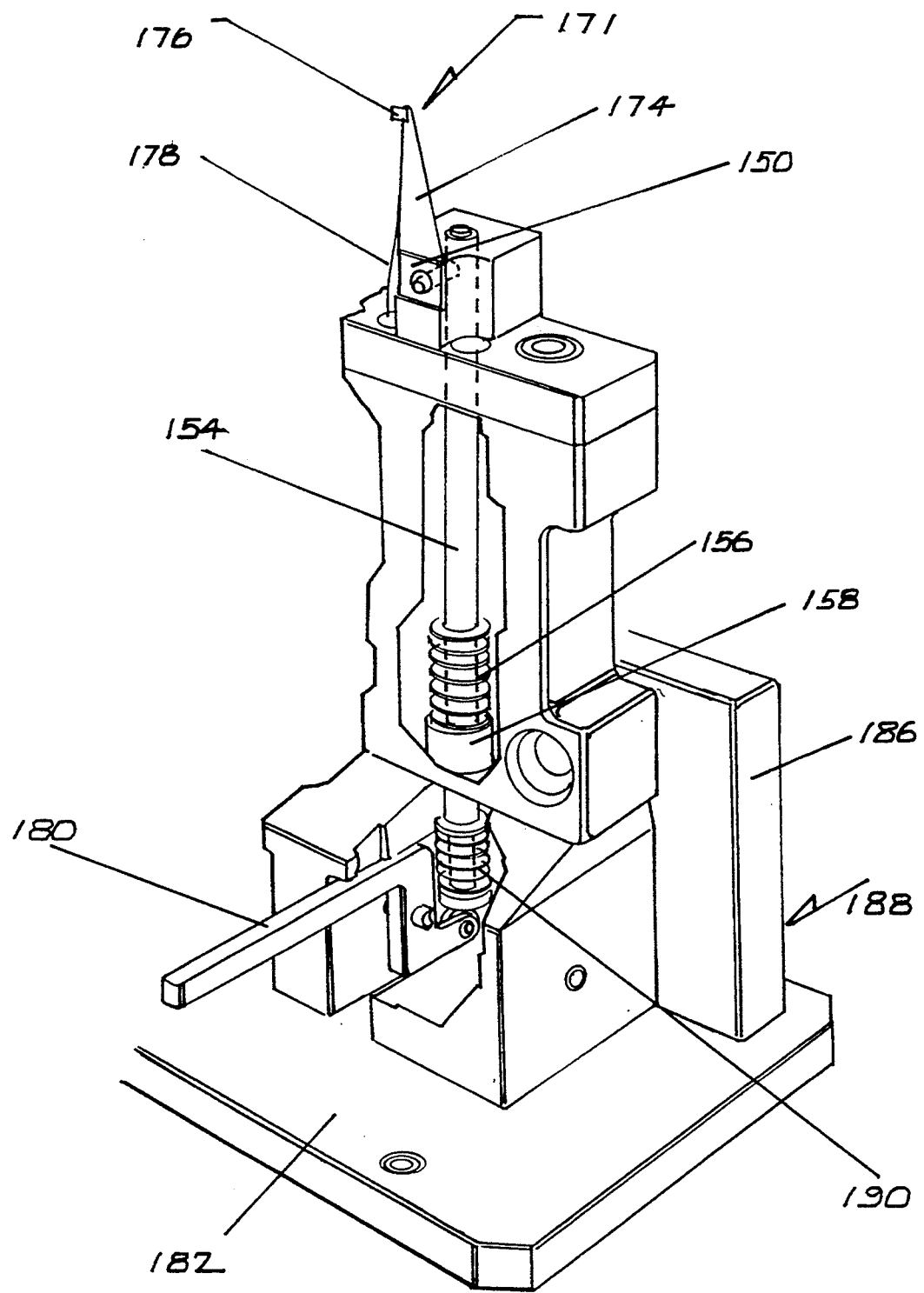
FIG. 4 is a perspective view of a section of FIG. 3 showing the unload jig lever spring mechanism.

During the loading operation at station 10, the transfer tool or puck 88 is actuated to mount the HFAs in a rigid repeatable defined orientation. The puck 88 to which the HFAs are mounted during the loading operation is processed by the operators through subsequent stations 12-36. At station 10, the puck is mounted on a jig 188 and located relative to the jig fixture by dowel pins 184 that are disposed on the back plate 186 of the jig 188, as illustrated in FIGS. 3 and 4. The levers or keys 180 of the jig fixture 188 are pressed downward causing the spring loaded mechanism 190 to be pressed up through the puck 88 so that an HFA may be mounted in the puck. The wire tubing assembly 178 attached to the HFA is dropped into open holes 172 of the puck, seen in FIG. 3. Two open holes 172 are provided on each side of each locking mechanism 170. Either of the holes 172 can be used for accepting the wire assembly 178, which is protected during movement of the puck through the different stations and operations. Each puck with four HFAs is passed to the lapping operation at station 12.

Figure 7A:
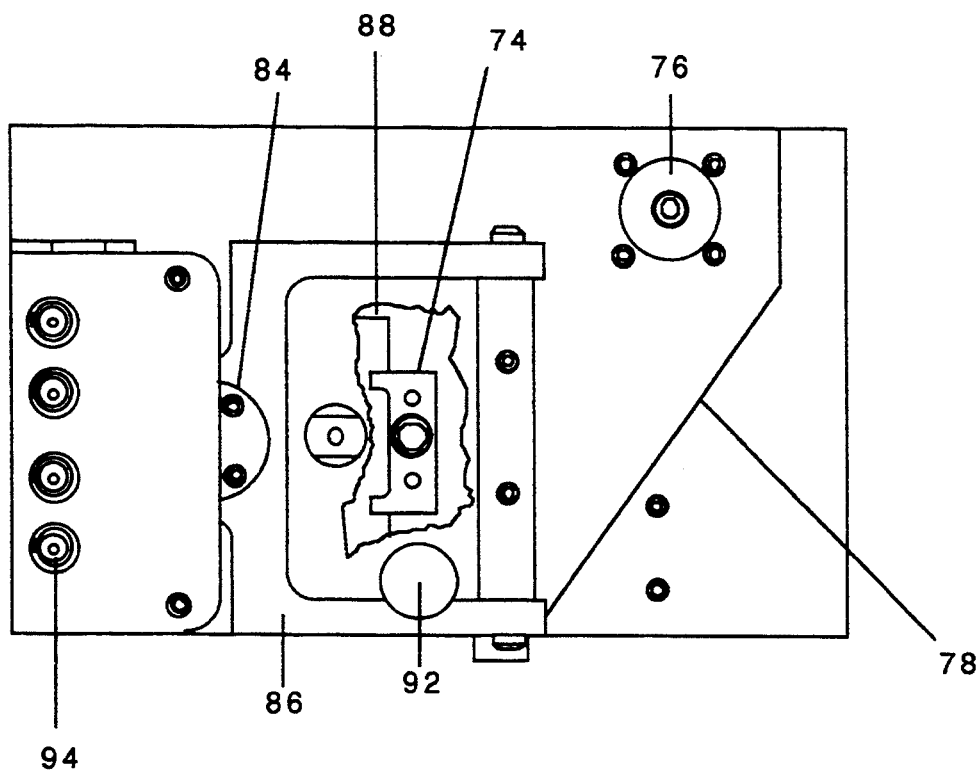
FIG. 7A is an orthogonal top view of the upper lapping assembly which mounts to the lapping equipment of FIG. 6.
Figure 7B:
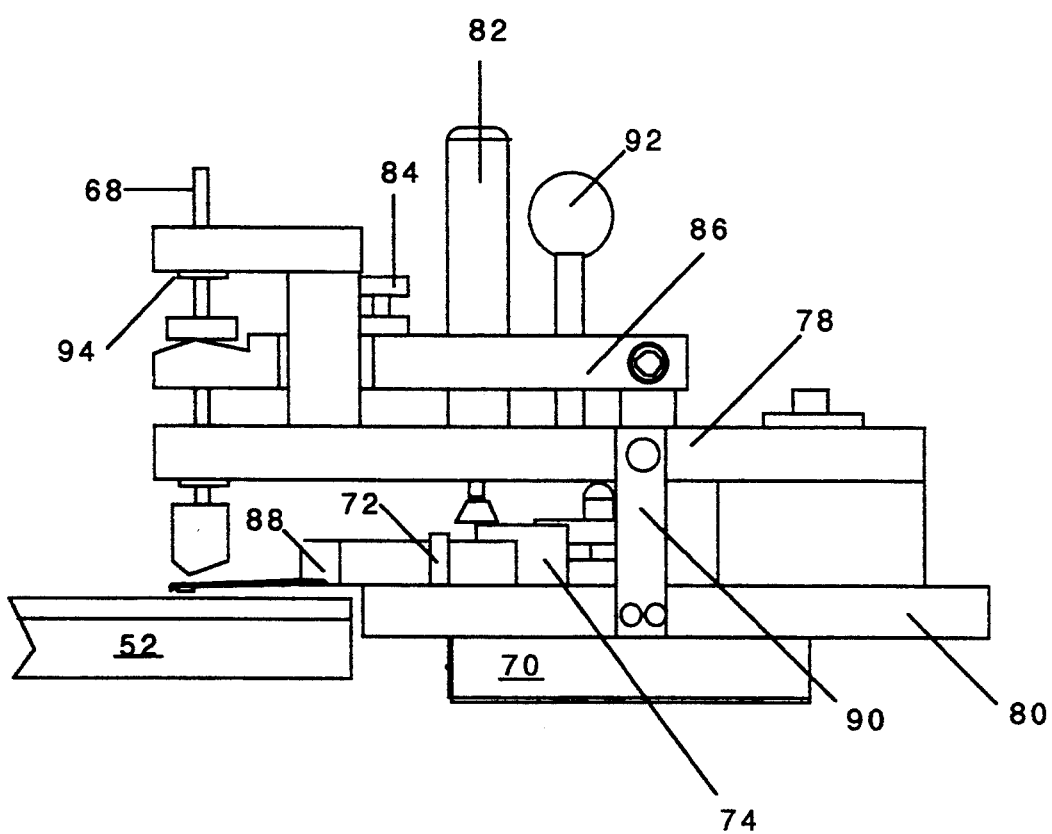
FIG. 7B is an orthogonal side view of the upper lapping assembly, showing a puck on a section of a lapping plate.

After the empty puck has been loaded with HFAs, two loaded pucks are placed in a plastic puck rack awaiting transfer to one of the lapping machines at station 12. The close proximity of the rack to station 12 requires little movement by the operator at station 12. The upper lapping plate 78 (FIGS. 7A, 7B) of the lapping machine is pulled across the puck, thereby locking the puck into place. By depressing a start button on a lapping control equipment, the lapping procedure is set into motion. The air bearing surface (ABS) of the slider 176 is lapped to achieve a positive crown with a tight distribution of crown from slider to slider. Also, the lapping operation provides control of the final magnetic throat height of the thin film transducer. This is accomplished by measuring throat height with an electronic system and then adjusting the lapping time to remove excessive slider material thereby adjusting throat height.

Figure 5:
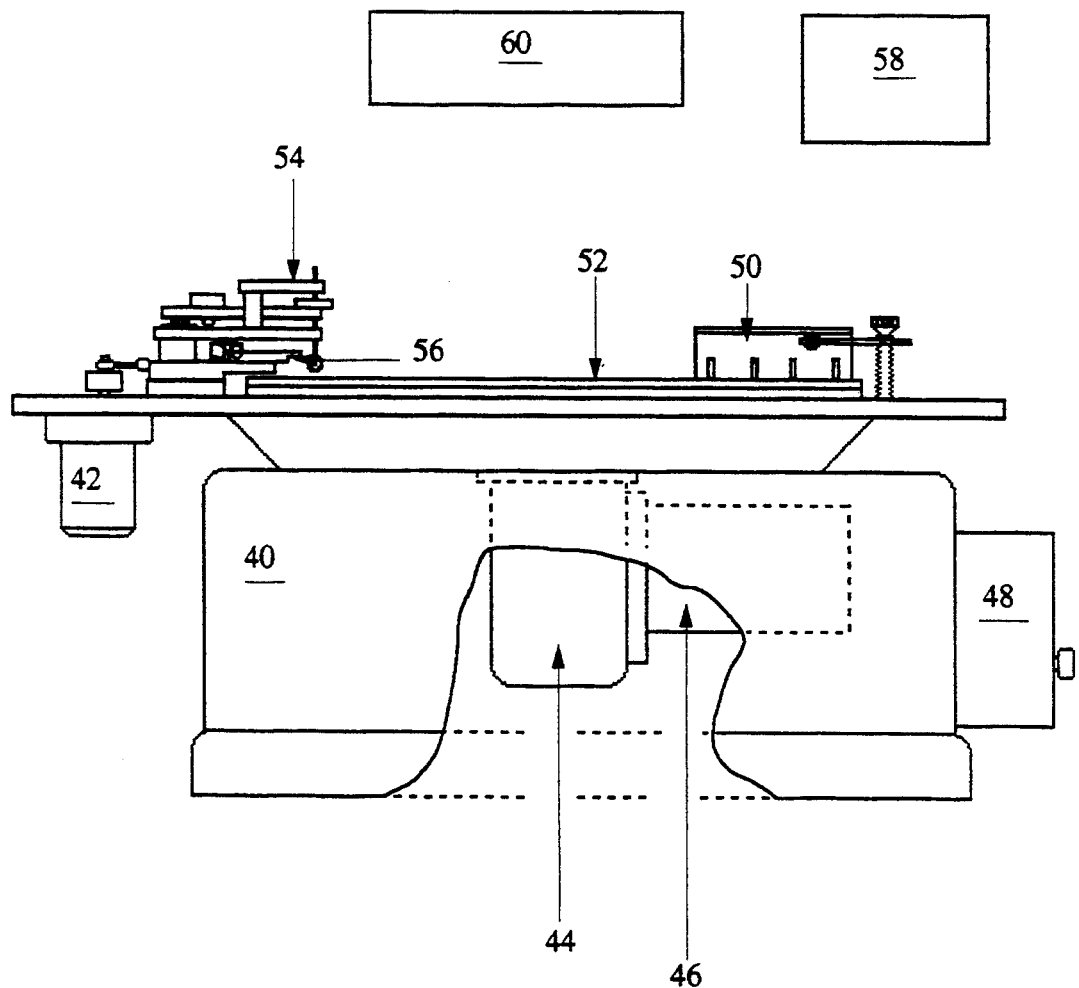
FIG. 5 is an orthogonal side view of lapping and tooling equipment used at station 12.
Figure 6:
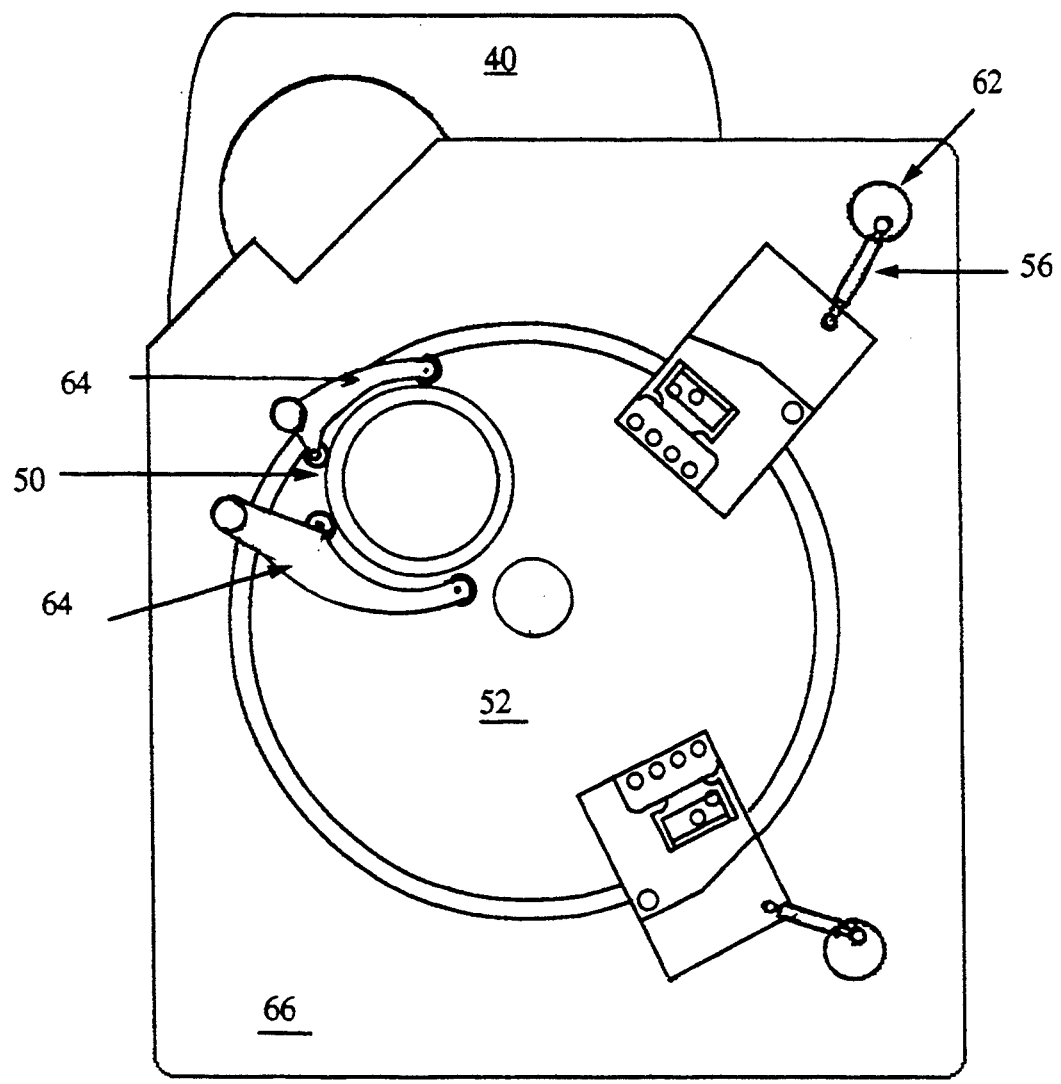
FIG. 6 is an orthogonal top view of the lapping and tooling equipment used at station 12.
Figure 8:
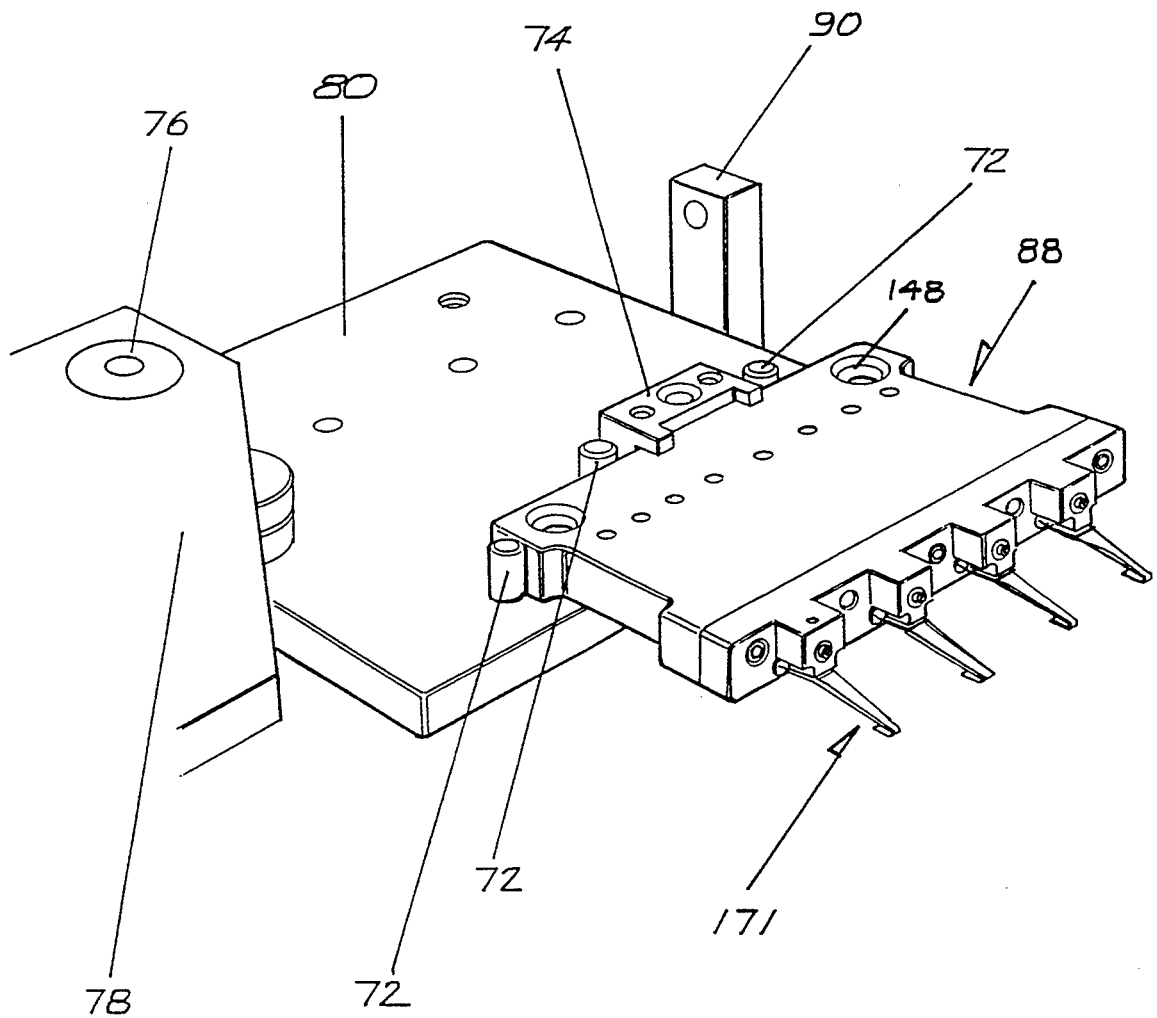
FIG. 8 is a perspective view of an upper lapping assembly with the top plate assembly swung open and the puck loaded in a spring loaded clamp.
Figure 9:
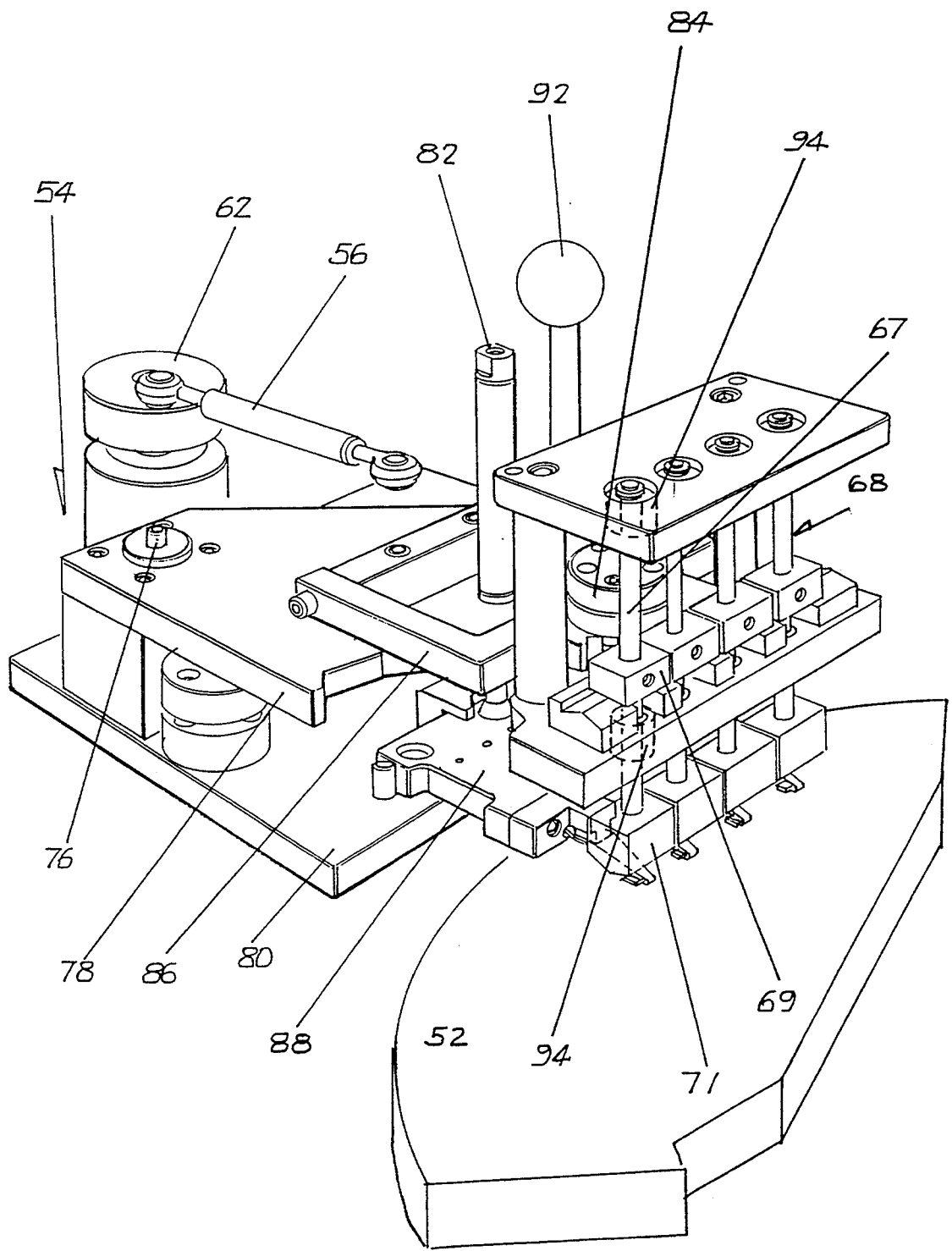
FIG. 9 is a perspective view of the upper lapping assembly showing an offset driving cam and a puck with four HFAs on a lapping plate.
Figure 10:
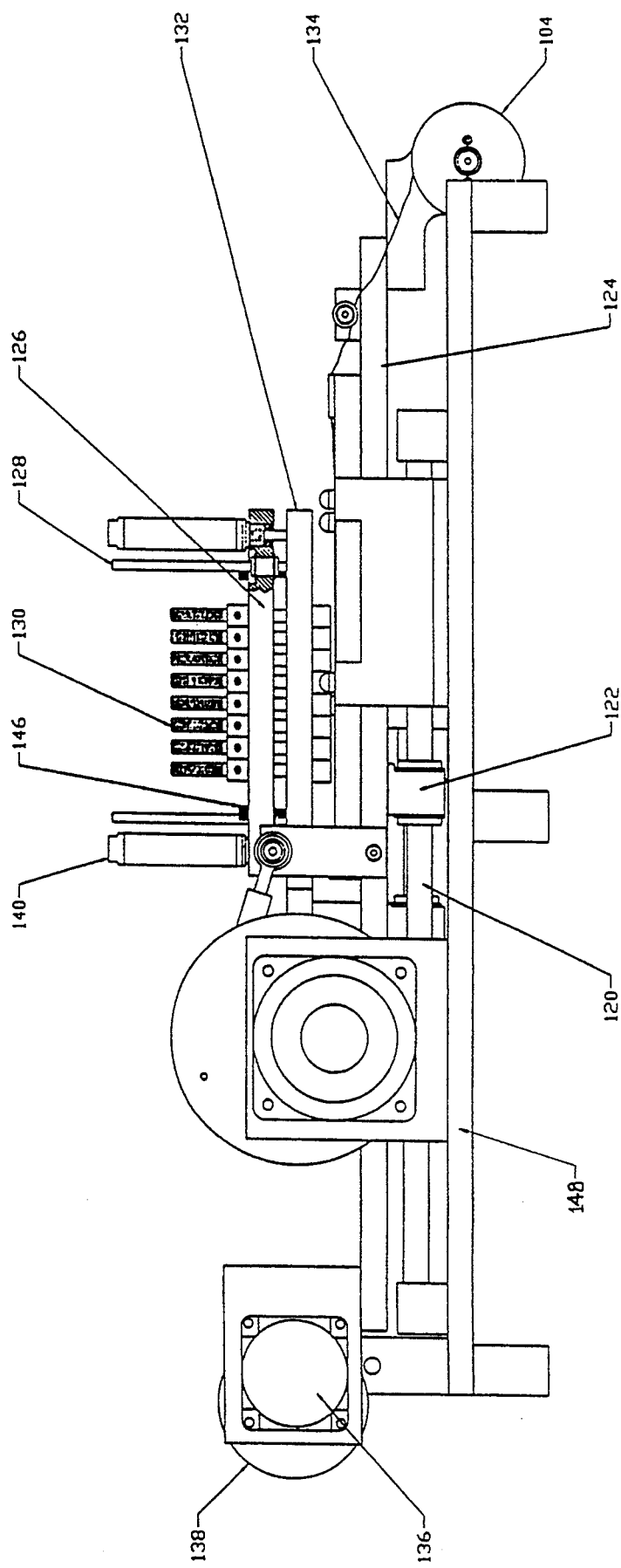
FIG. 10 is an orthogonal side view of edge blend equipment and tooling for performing edge blend operation on the head sliders.

With reference to FIGS. 5 and 6, two upper lapping assemblies 54 (FIG. 5), which are mirror images of each other, are mounted to a lapping machine baseplate 66 and holds the puck and HFAs over a lapping plate 52 at a defined height. The upper lapping assembly 54 applies a dead weight shaft assembly 68 (FIG. 7B) of approximately 40 grams on a head flexure while the lapping plate 52 rotates against the ABS. During the rotation of the lapping plate 52, the lapping assembly is moved in and out along a radial line of the lapping plate by oscillation motor 42. The motor 42 turns an offset cam 62 (FIG. 6) which strokes the upper lapping element 54 in an oscillatory motion. The cam 62 is connected to motor 42 by linkage 56. A gear head 44 serves as a gear reducer between a DC motor 46 and lap plate 52. A controller 48 varies the speed of the motor 46 thus varying the speed of operation of lap plate 52. A ceramic ring 50 embeds diamond slurry into a tin/antimony alloy of the lap plate 52. The slurry is metered by a dispenser 58 which controls the amount of slurry to be dispensed. A roller assembly 64 holds the ceramic ring 50 in a fixed position within a circumferential band. Offset cam 62 and drive linkage 56 use a linear slide assembly 70 (FIG. 7B) mounted under the upper lapping asembly during oscillation. As the lapping plate is rotating, the oscillation motion causes the ABS to be lapped in a figure eight pattern, thus providing an equal lapping exposure across the head sliders being lapped. The puck is positioned on the upper lapping assembly by three alignment pins 72 (FIG. 8). A spring loaded puck clamp 74 holds the puck temporarily in position. The upper lapping assembly consists of two plate assemblies that rotate on a shaft 76. The top plate assembly 78 swings in a parallel plane relative to the plate assemblies. When the plate assemblies are swung open, access is provided to the bottom plate assembly 80 so that the puck may be placed against locating pins 72 and under the spring loaded puck clamp 74.

With reference to FIGS. 7A, 7B, 8 and 9, with the top plate assembly 78 swung closed, the puck clamping air cylinder 82 is actuated by a controller 60 and applies a force downward on the puck assembly, thereby holding it rigidly against the bottom plate assembly 80. After the puck clamp cylinder 82 is actuated, lapping plate 52 begins to rotate and the dead weight shaft 68 drops slowly onto the head flexure assembly. By way of example, the load that is applied by the dead weight shaft 68 is located behind the dimple of the head flexure towards the rear mount plate 150 (FIG. 2) is in the range of 0.040–0.100 inch from the dimple of the suspension assembly.

The dead weight shaft assembly 68 is formed with a hardened shaft 67 that floats in the vertical direction on two mounted linear slide bearings 94. The hardened shaft 67 has a Delrin block 71 tapered to apply a line contact force across the back of the load beam of the head flexure. Square blocks 69 of brass are fixed to the hardened shaft 67 to supply a downward force and to act as a contact point for a hinged lifter 86 in order to raise the dead weight. The drop speed of the dead weight assembly is controlled by a needle valve that controls the flow of air to the dead weight unloading cylinder 84. The hinged lifter 86 lowers and raises the dead weight shaft assembly 68 when the cylinder 84 is actuated by the controller 60.

The lapping plate 52 is rotated for a predetermined period of time in a clockwise motion, then is stopped and reversed in direction for a defined period of time. When the lap plate 52 is stopped during the first rotation in one direction, the controller 60 will actuate cylinder 84 to raise the dead weight shaft assembly 68, then will start the lap plate 52 rotating in the opposite direction, and then lower the dead weight shaft assembly 68 slowly by actuating cylinder 84. The starting direction of the lapping plate is product dependent. The defined period of time of rotation may not necessarily be equally balanced.

After the lapping procedure has been completed, the lapping operator at a lapping machine station 12 places the pucks into a liquid reservoir at station 14. The HFAs with lapped sliders are immersed in a liquid bath thereby exposing the heads to a hydrogen peroxide solution.

At station 16, lapping slurry that has been left on the ABS from the lapping operation at station 12 is removed. The operator at station 16 places two puck assemblies, each carrying four head flexure assemblies, into a wash vessel and then closes the lid of the vessel. A timed cycle of oscillating spray including a clean dry air phase and a deionized (DI) water phase is started by the operator. The flexure assemblies are cleaned by clean dry air for approximately 15 seconds. The head flexure assemblies are exposed to the oscillating spray that sprays deionized (DI) water for about 13 seconds. The DI water is provided at 80 pounds per square inch and the clean dry air is provided at a pressure of about 100 pounds per square inch through a nozzle having eight slots measuring 0.025 inch in length and 0.015 inch in width. The cycle begins with actuation of the water and air application at the same time, with the air cycle portion continuing for two seconds after the water cycle portion ends. The wash vessel at station 16 is contained within a larger vessel having a cover and a drain pan to separate this operation from the clean room environment.

After unloading the pucks from the wash vessel at station 16, the cleaned pucks are placed onto a drying pad at station 18. With the aid of a small air wand, the head flexures are subjected to air blowing action to remove water that may have beaded on the surface of the head flexure assembly. The area around the wires that extend from the flexure is dried carefully in order to avoid damage to the assembly. As a result, all excess moisture is removed from the flexure assembly to enable the units to be properly dried at a drying vessel at station 20.

The drying vessel includes a heating mechanism which evaporates any water that may have been left on the HFAs when they were treated in the wash vessel at station 16. The temperature setting of the heating mechanism is preferably about 300° F. and clean dry air is applied at a pressure of about 80 pounds per square inch and 10–20 cfm for approximately 15 seconds. The pucks are then placed onto dowel pins in heater boxes and the lid of the drying vessel is closed so that the drying cycle can begin. After the drying procedure ends, the pucks 88 are removed from the heater box and are placed onto puck rests disposed between the heater box and an edge blender at station 22. At station 22, an operator places the pucks on dowel locating pins 108 (FIG. 12) situated on the top side of the edge blend machine (FIGS. 10–17). The edge blend assembly holds two pucks and eight HFAs fixed over a moving strip of ½ inch diamond backed Mylar lapping tape 134, the size of the diamonds being about one micron. The puck is held at a selected height above the diamond tape 134, for example 0.020 inch. The puck holds the HFAs with the ABS of the slider against the diamond tape.

The edge blend cycle is started by depressing a controller start button so that the sliders are stroked by the controlled tape moving relative to the sliders. Upon loading the pucks to the edge blender, a dead weight assembly 130 that is part of the upper slide assembly 132 is pulled forward and locked into place. Weight is applied on the back of the HFA by the dead weight assembly 130. Each HFA has an independent dead weight assembly that applies a defined load, in the range of 30–50 grams for example. The diamond tape strip moves as a complete unit 124 under the HFAs while the dead weight is applied. The oscillating tape lower plate assembly 124 moves or strokes in forward or reverse directions by a rotating offset cam 118 that is driven by motor 96 (FIG. 11) and is connected by linkage element 98 to the oscillating lower plate assembly 124. The offset cam 118 is driven by a DC motor 96 at approximately 10–20 rotations per minute. The diamond tape also feeds at a relative speed to the oscillating lower plate assembly 124 during the time that the lower plate 124 is stroking under the HFAs. The tape 134 moves relative to the lower plate 124 at about four inches per minute, by way of example.

A feed reel 104 has an adjustable friction clutch to adjust the tension of the tape, approximately 2–5 pounds by way of example, as the tape is fed across the blending work surface. The diamond backed tape feeds from the reel 104 under a diamond tape alignment roller across a soft rubber pad 106 (FIG. 16), and under an alignment roller 100, and is then taken up by diamond tape takeup reel 138. The takeup reel 138 is driven by a DC motor 136. Alignment rollers 100 and 102 provide consistent tracking for the diamond tape 134. The soft rubber pad 106 under the diamond tape is held down to the oscillating lower plate 124 and conforms the tape to the rails of the head slider for edge blending. The rubber pad 106 is about 1.25 inches in width and is long enough to be drawn snugly and locked into place by two hold down shims located on each end of the lower plate 124. The pad rubber has a durometer rating of 50 and a thickness of 0.031 inch by way of example. The height of the pucks above the diamond tape is set by adjustment mount plate 110. The relative location of the contact point on the back of the HFA by the dead weight assemblies 130 is also adjusted by the adjustment mount plate 110.

The dead weight assembly 130 is formed with a hardened shaft 129 floating vertically in a linear bearing 131 mounted in the upper slide plate 132. The line contact point on the back of the load beam of the head flexure is achieved by a round Delrin shaft 133 that is mounted perpendicular to the bottom of the hardened shaft. The load force is provided by a rectangular brass weight 135 mounted to the Delrin shaft above the lift plate 126. The rectangular brass weight serves as a pickup contact surface for the lift plate 126. The line contact location of the dead weight is approximately 0.040–0.100 inch behind the dimple of the flexure moving towards the mount plate 150. The HFAs locations are adjusted so that the pucks which place heads on the diamond tape will position the HFAs to have a straight line of dead weight contact along all eight heads of the four HFAs during the edge blend operation.

Figure 11:
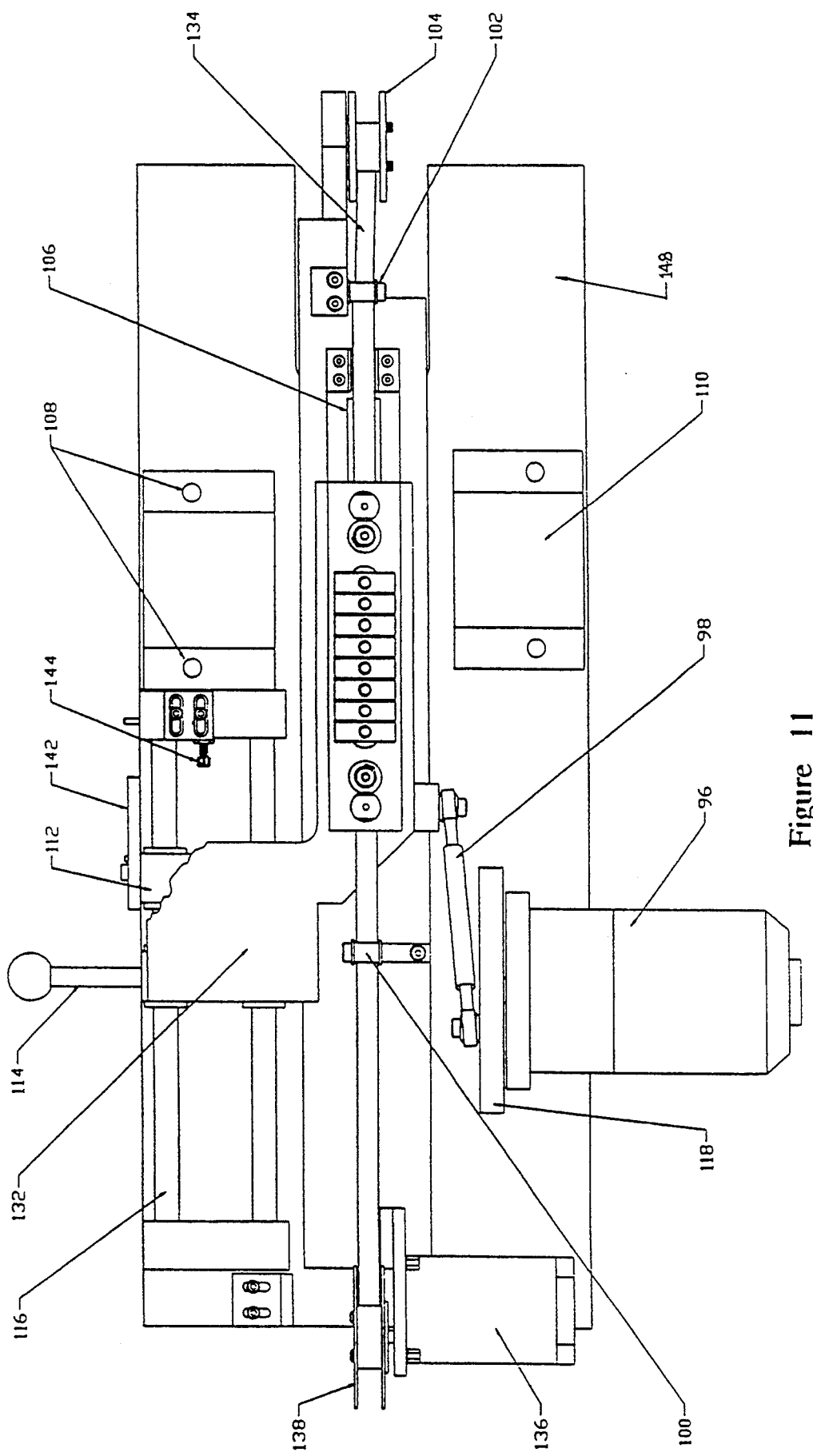
FIG. 11 is an orthogonal top view of the equipment and tooling illustrated in FIG. 10.
Figure 12:
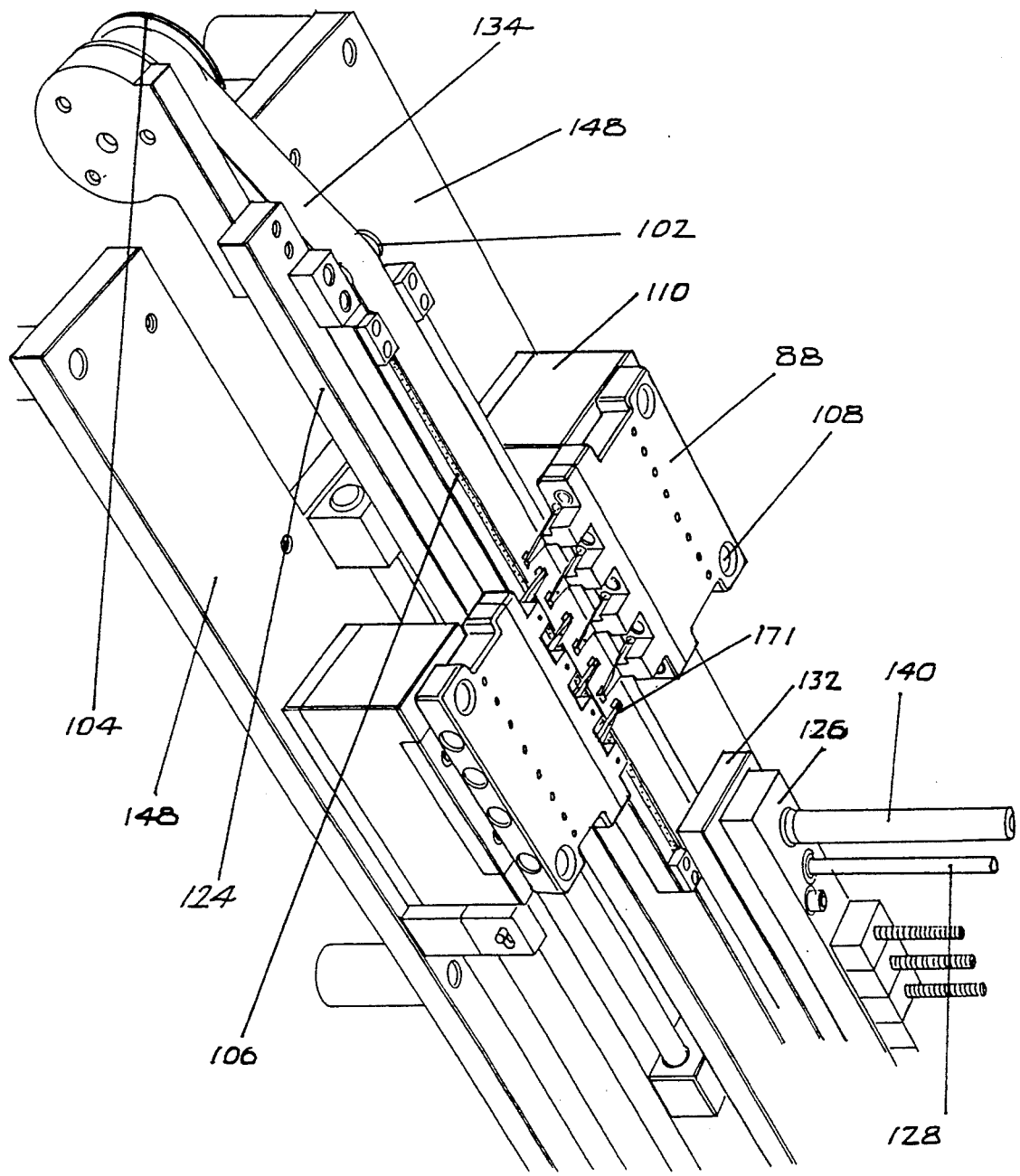
FIG. 12 is a perspective view of edge blend equipment showing two pucks on the machine with the upper slide plate in retracted position.
Figure 13:
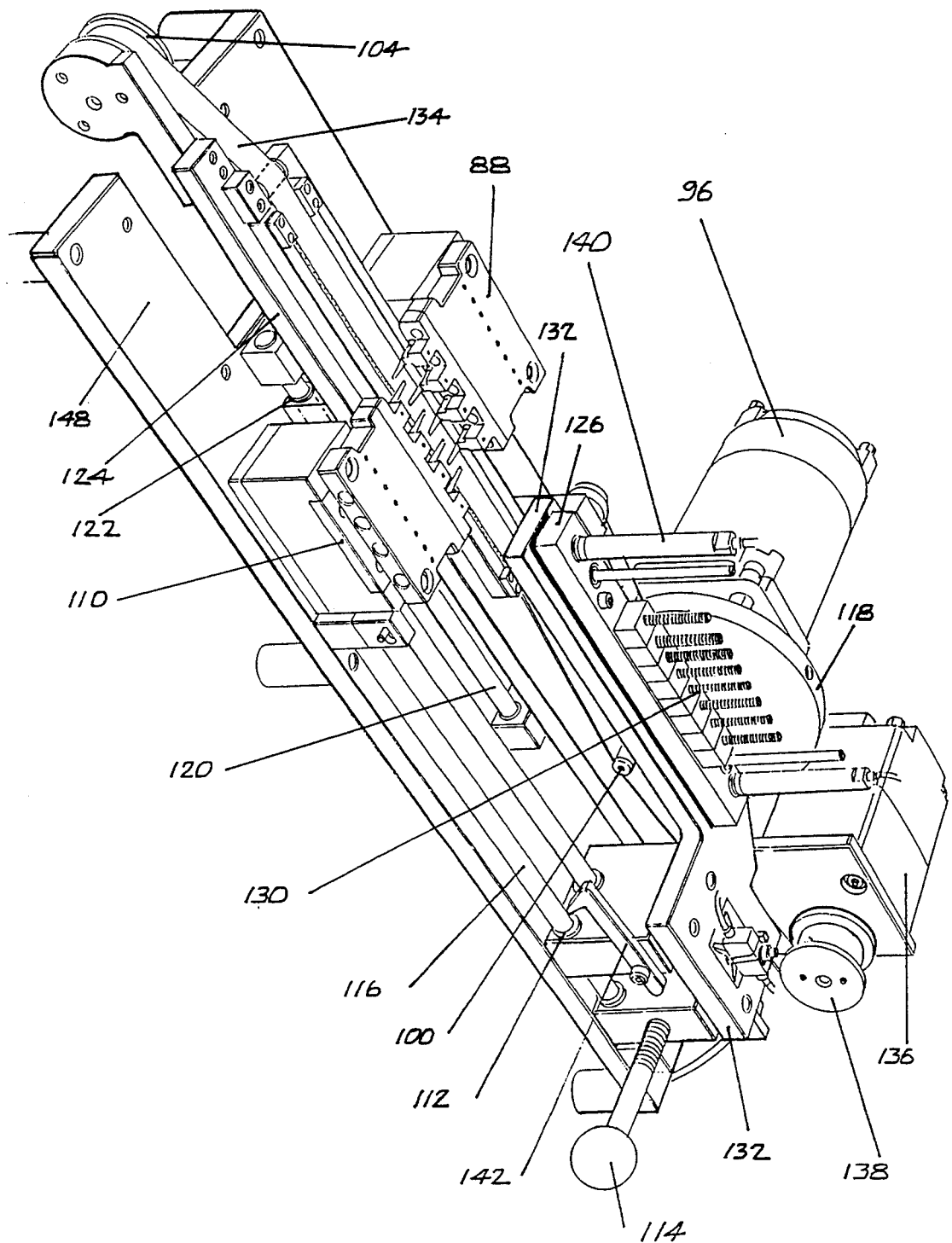
FIG. 13 is a perspective view of the edge blend equipment showing additional details of the tooling.
Figure 14:
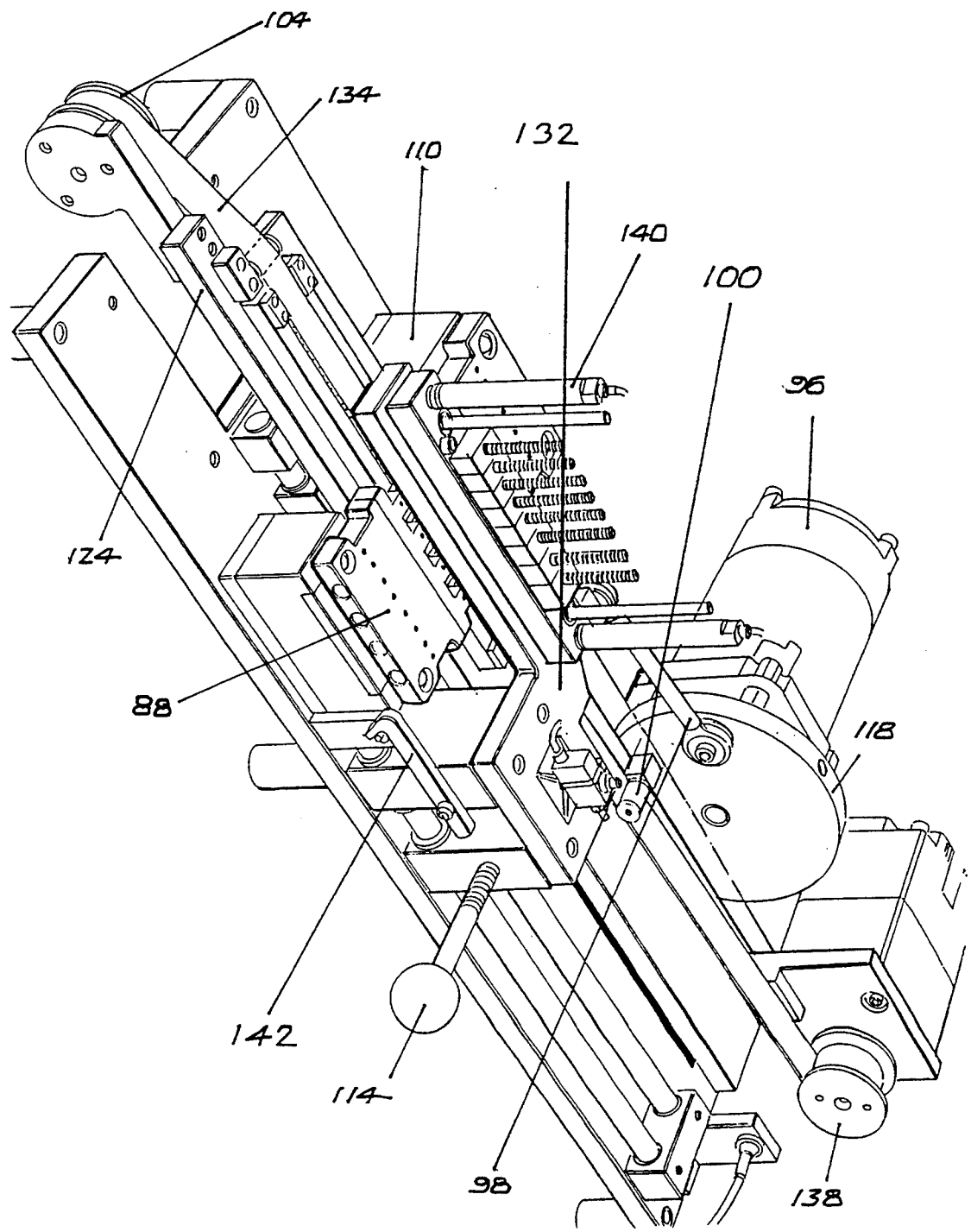
FIG. 14 is a perspective view of the edge blend equipment showing two pucks on the machine with the upper slide assembly pulled over the HFAs and the dead weight assemblies applying a load on the flexures, and with the lower slide assembly being fully stroked to one side of the equipment.
Figure 15:
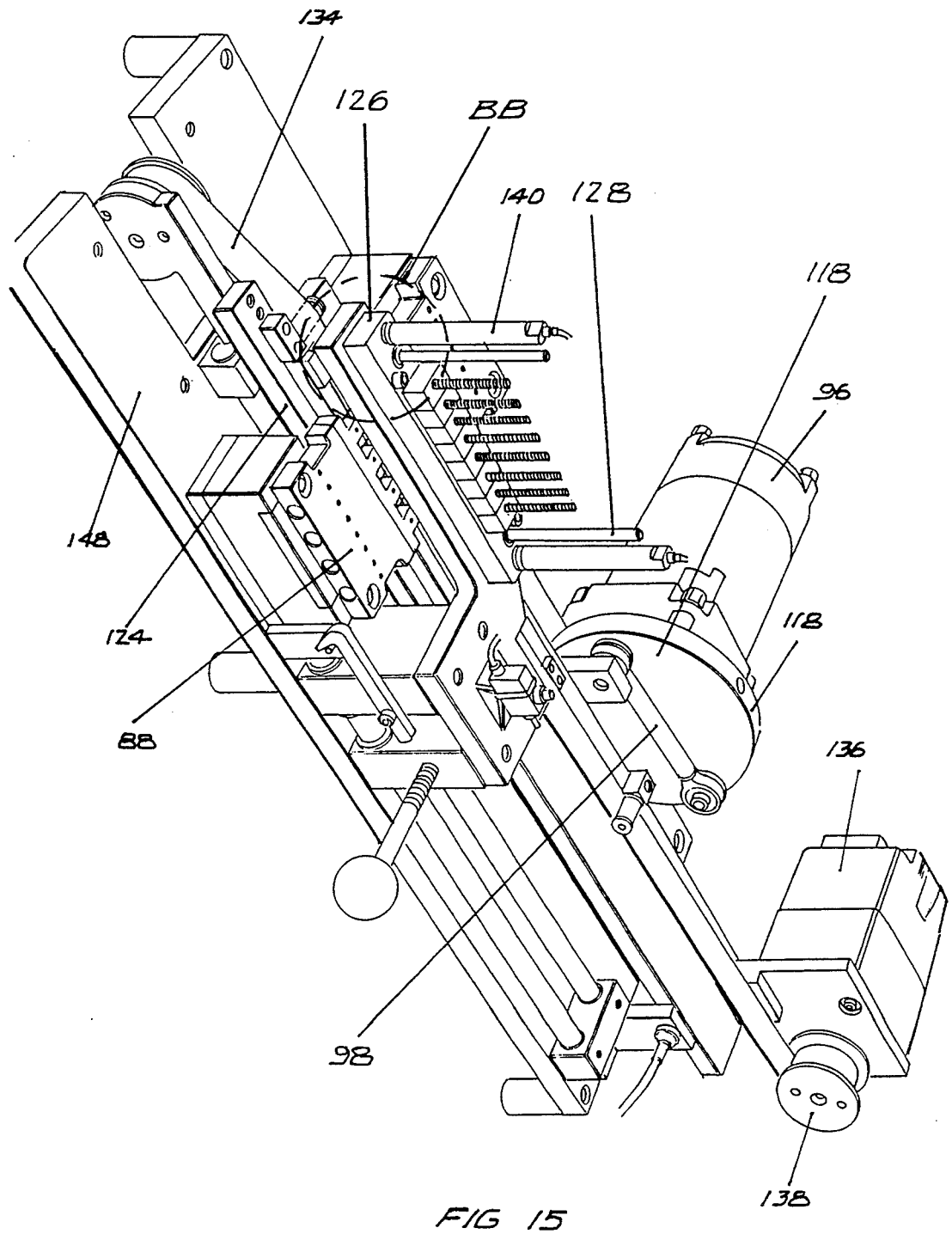
FIG. 15 is a perspective view showing the edge blend equipment of FIG. 14, but with the lower slide assembly fully stroked to the opposite side of the equipment.
Figure 16:
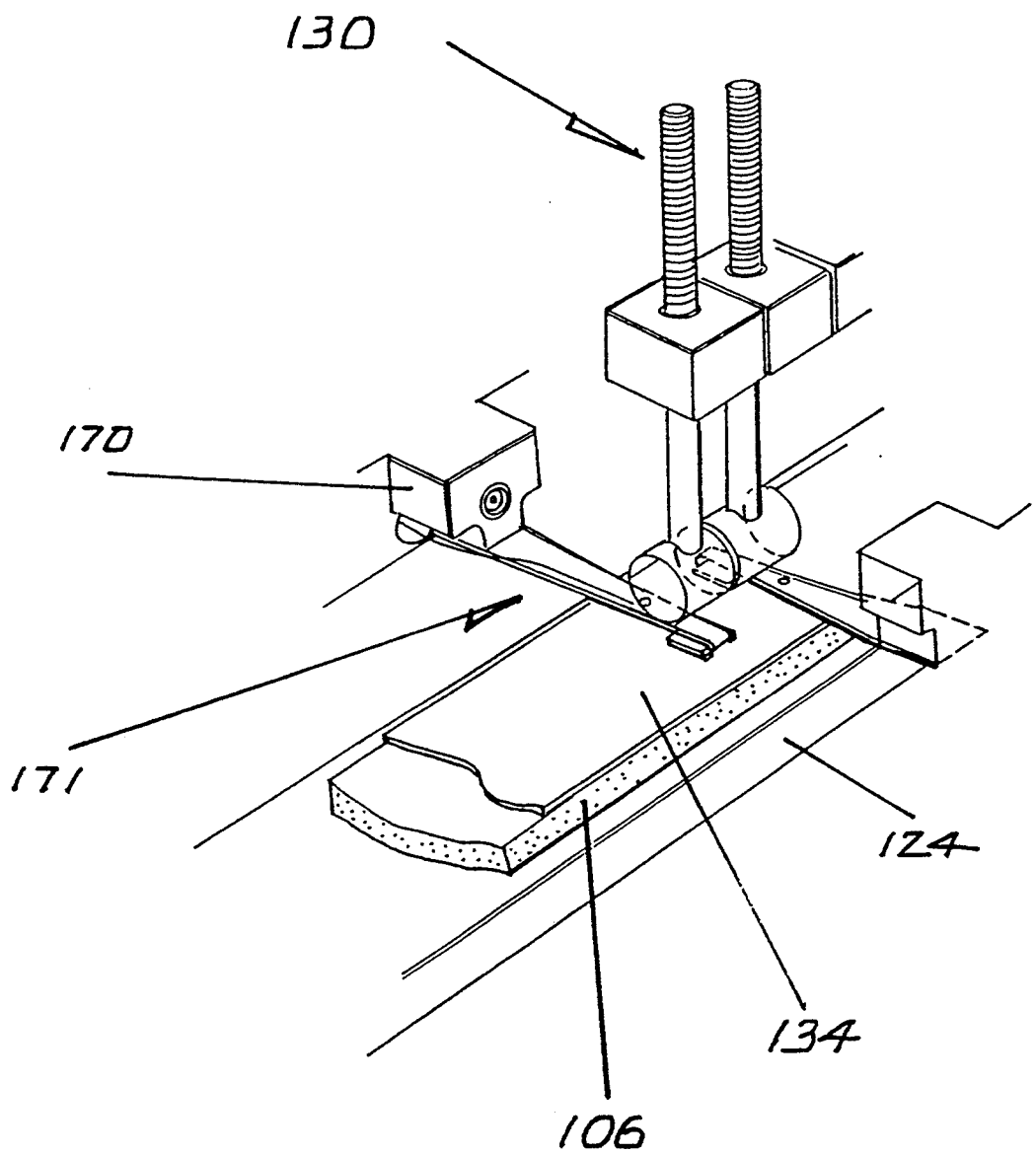
FIG. 16 is an enlarged perspective view of the dead weight assembly applying a load on a section of two pucks with HFAs, depicted in section B—B taken from FIG. 15.
Figure 17:
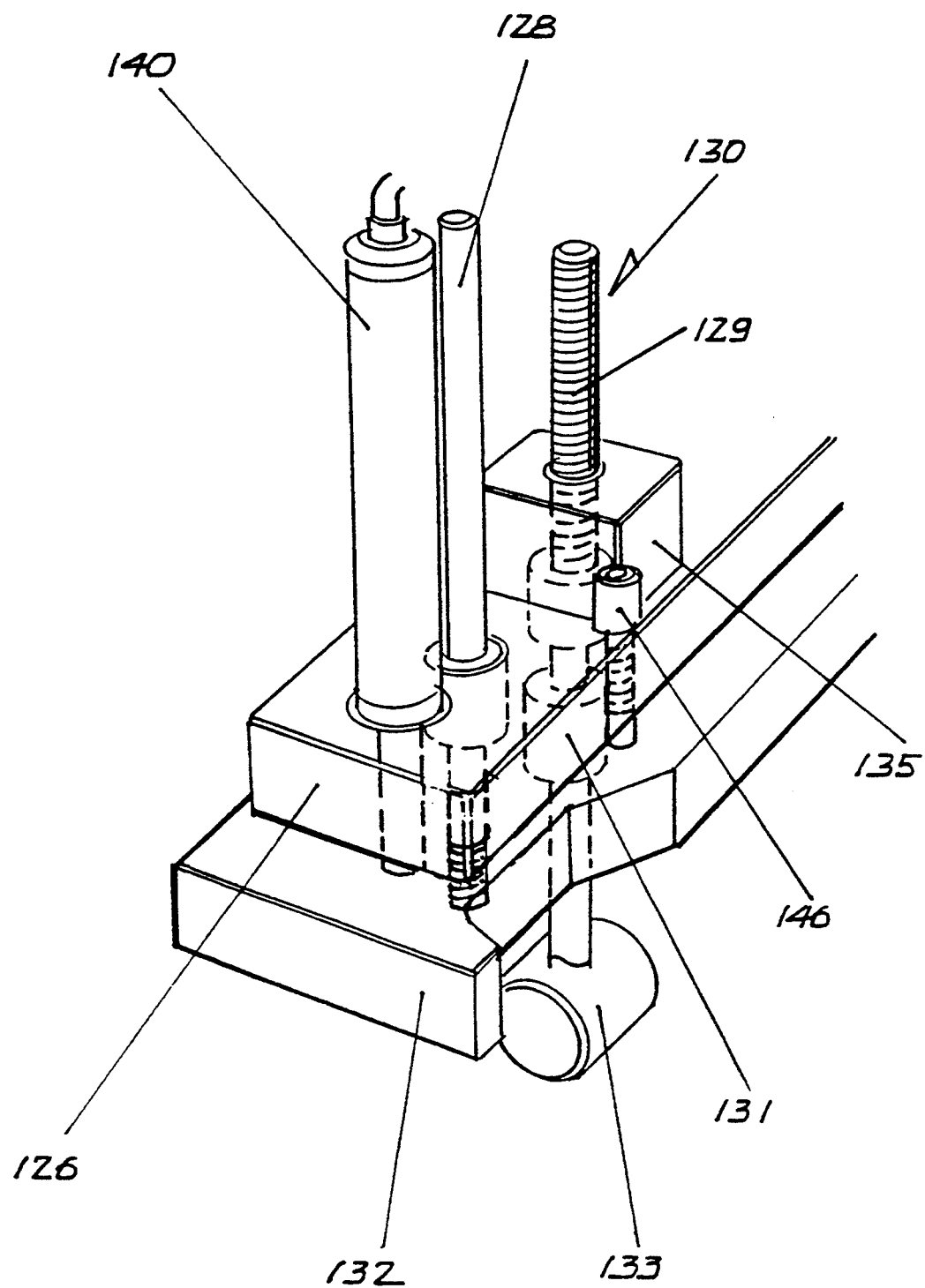
FIG. 17 is a perspective view showing a portion B—B taken from FIG. 15.

The upper slide plate 132 slides over the two pucks with the HFAs through an attachment to the upper slide plate of linear bearing 112 and the guide shafts 116 mounted to the baseplate 148. The lift plate 126 moves on linear slides up and down on the guide shafts 128 mounted in the upper slide plate 132. The lift plate 126 is actuated by pneumatic cylinders 140 which are screwed into the lift plate so that cylinder pistons are moved up or down against the upper slide plate 132. Guide shafts 128 (FIG. 15) prevent cocking of the lift plate 126. The lift plate 126 is set in an UP position by lift stop adjustment screws 146. The lift plate drops down thereby loading the dead weights against the HFA. The speed of descent is regulated by a needle valve assembly in line with two one-sided pneumatic air cylinders. The upper slide plate 132 is locked in by a latch 142 (FIG. 13) and positioned over the HFAs with the dead weight assemblies by a slide adjustment stop 144 (FIG. 11). The upper slide plate 132 is moved back and forth by a handle 114 so that the pucks may be placed on the adjustment mount plate 110 and located accurately and repetitively by using locating dowel pins 108 to align the pucks and to adjust the position of the pucks for tape clearance. Lower plate guide shaft 120 and linear slide bearing 122 (FIG. 13) allow the lower plate 124 to oscillate back and forth. After a predetermined number of applied tape strokes, such as 1–3 strokes, the edge blend procedure is terminated and the lift plate raises the dead weight assembly 130 and the upper side plate 132 is moved back to allow access to the pucks.

The pucks are then removed from the edge blender station 22 and placed into a liquid reservoir 24, thereby exposing the head flexure assembly to a liquid bath containing hydrogen peroxide solution. The pucks are then placed onto dowel locating pins at the top of an ultrasonic tank at station 26. The tank includes mechanisms that sense that the puck has been installed and as a result engages a locking mechanism for securing the puck and its flexures for a specified length of time. During that period, the tank 26 uses ultrasonic energy to create a cleaning action in a liquid detergent and DI water mix wherein the ABS of the head flexure is immersed. The cleaning action removes the diamond particles that may have remained on the ABS of the head slider during the edge blending process at station 22.

After the ultrasonic cleaning at station 26, the ABS of the head flexure is immersed in DI water of a rinse tank at station 28. The DI water bath ensures that any detergent that may remain on the ABS from the ultrasonic cleaning at station 26 is removed. The rinse tank includes a locking mechanism that is engaged when the puck is installed thereby starting a cycle period during which the puck assembly is cleaned.

The puck assembly is then transferred to station 30 which has a wash vessel with an oscillating spray. The oscillating spray is applied against the ABS for a timed cycle of about 15 seconds for the clean dry air cycle portion and approximately 13 seconds for the DI water cycle portion. The DI water is applied at about 80 pounds per square inch and the clean dry air is applied at a pressure of about 100 pounds per square inch through a nozzle having eight slots 0.025 inch in length and 0.015 inch wide. This operation serves to remove any detergent residue.

At station 32 the pucks from the wash box at station 30 are placed onto a drying pad. By using a small air wand, any remaining beaded water is blown off the head flexures. At station 34, a drying vessel having a heating mechanism evaporates any water that remains on the head flexure assemblies from the wash vessel at station 30. The heat is applied at a temperature of about 300° F. and clean dry air is applied at a pressure of about 80 psi and 10–20 cfm for about 15 seconds. The pucks are placed onto dowel pins in the heater boxes of the drying vessel and the lid of the vessel is closed to begin the drying cycle. The result is the removal of all moisture from the head flexure assemblies.

At station 36 the pucks are stored and then moved to station 38 where operators remove individual pucks from the puck rack and place the puck into the load/unload jig. The HFAs are unloaded and are placed into trays. When the puck has been completely unloaded, the puck and jig assembly is passed to the first operator at which position 10 the procesing of pucks and unprocessed HFAs begin.

By virtue of the compact arrangement of the operator stations and the use of lapping and edge blending equipment and tooling, inter alia, which are novel in design, and the prescribed sequence of process steps implemented by the novel apparatus disclosed herein, head flexure assemblies including air bearing sliders are efficiently processed and produced with high quality, resulting in an improved yield produced in a compact reduced manufacturing area. Due to the improved distribution of the crown parameter and the edge blend parameter of the population of sliders processed by means of the operation disclosed herein, a resulting desired flying height distribution of the slider air bearing surface-to-disk spacing is obtained. A tighter flying height distribution produces a higher quality HFA and more consistent performance of the HFAs resulting in improved reliability and magnetic performance. The space utilized for the operations at the stations described herein is about 15 feet by 15 feet, or a square foot area of about 225 square feet.

By processing thin film head sliders as disclosed herein, the standard deviation of the flying height of a nominal slider flying at 5 microns is decreased from 0.83 microns to 0.4 microns, thus providing a narrower distribution of flying heights for the finished sliders, resulting in improved reliability in disk files that employ several slider-disk interfaces.

It should be understood that the invention is not limited to the specific parameters such as pressure, temperature, and the like, and the materials disclosed herein.

What is claimed is:

1. A method of processing magnetic head flexure assemblies supporting air bearing sliders on which thin film transducers are deposited comprising the steps of:
   loading one or more transfer tools or pucks to each of a jig fixture;
   loading a plurality of head flexure assemblies with said sliders to pucks;
   unloading said pucks with said head flexure assemblies from said jig fixture;
   securely positioning said pucks loaded with said assemblies in a lapping machine comprising a lapping plate assembly, and lapping said sliders independently with independent dead weight assemblies to obtain a predetermined geometry of the air bearing surfaces of said sliders and to provide a desired throat height for said transducers.

2. A method as in claim 1, including a step of cleaning said assemblies in a liquid bath.

3. A method as in claim 2, wherein said step of cleaning comprises immersing said assemblies in a hydrogen peroxide solution.

4. A method as in claim 2, including a step of applying clean dry air and a step of washing said assemblies in an oscillating spray of deionized water.

5. A method as in claim 4, wherein said step of applying clean dry air comprises applying clean dry air for about 15 seconds and said step of washing comprises applying deionized water for about 13 seconds.

6. A method as in claim 4, wherein said step of applying deionized water comprises applying deionized water at about 80 pounds per square inch and said step of applying clean dry air comprises applying clean dry air at a pressure of about 100 pounds per square inch.

7. A method as in claim 6, wherein said step of applying clean dry air comprises applying clean dry air through a nozzle having eight slots measuring approximately 0.025 inch in length and 0.015 inch in width.

8. A method as in claim 4, including a step of drying said assemblies on a drying pad and a step of subjecting said assemblies to an air blowing action to remove water.

9. A method as in claim 8, wherein said step of drying is achieved at about 300° F.

10. A method as in claim 8, including a step of edge blending said sliders independently for shaping the edges of said sliders.

11. A method as in claim 10, wherein said step of edge blending comprises a step of moving a diamond lapping tape across the surfaces of said sliders.

12. A method as in claim 11, wherein said diamond tape oscillates across said slider surfaces.

13. A method as in claim 10, wherein said step of edge blending comprises a step of applying independent dead weight assemblies to said head flexure assemblies.

14. A method as in claim 10, including a step of ultrasonic cleaning said assemblies to remove diamond slurry.

15. A method as in claim 1, wherein said lapping step comprises locking said pucks in place to said lapping machine and rotating said lapping plate assembly while moving said lapping plate assembly linearly.

* * * * *